United States Patent
Koga et al.

(10) Patent No.: US 8,081,950 B2
(45) Date of Patent: *Dec. 20, 2011

(54) POWER LINE COMMUNICATION APPARATUS AND POWER LINE COMMUNICATION METHOD

(75) Inventors: Hisao Koga, Fukuoka (JP); Nobutaka Kodama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/083,300

(22) Filed: Apr. 8, 2011

(65) Prior Publication Data

US 2011/0183642 A1 Jul. 28, 2011

Related U.S. Application Data

(63) Continuation of application No. 12/626,524, filed on Nov. 25, 2009, now Pat. No. 7,925,239, which is a continuation of application No. 11/398,707, filed on Apr. 6, 2006, now Pat. No. 7,627,304.

(30) Foreign Application Priority Data

Apr. 8, 2005 (JP) .................................. 2005-112318

(51) Int. Cl.
*H04M 9/00* (2006.01)
(52) U.S. Cl. ....................... 455/402; 340/12.32; 375/257
(58) Field of Classification Search .................. 455/402; 340/12.32
See application file for complete search history.

(56) References Cited

U.S. PATENT DOCUMENTS

| 4,471,399 | A | | 9/1984 | Udren |
| 4,479,215 | A | | 10/1984 | Baker |
| 4,749,992 | A | | 6/1988 | Fitzemeyer |
| 5,251,191 | A | | 10/1993 | Sturzl |
| 5,491,463 | A | | 2/1996 | Sergeant |
| 5,694,436 | A | | 12/1997 | Huang |
| 5,812,557 | A | | 9/1998 | Stewart |
| 5,982,276 | A | | 11/1999 | Stewart |
| 6,144,292 | A | * | 11/2000 | Brown .......................... 455/402 |
| 6,154,488 | A | | 11/2000 | Hunt |
| 6,275,144 | B1 | * | 8/2001 | Rumbaugh .................... 375/259 |
| 6,404,773 | B1 | * | 6/2002 | Williams et al. .............. 370/463 |
| 6,498,808 | B1 | | 12/2002 | Tzannes |

(Continued)

FOREIGN PATENT DOCUMENTS

EP 1 424 787 6/2004

(Continued)

OTHER PUBLICATIONS

International Search Report dated Jun. 2, 2006.

(Continued)

*Primary Examiner* — Sharad Rampuria
(74) *Attorney, Agent, or Firm* — Dickinson Wright PLLC

(57) ABSTRACT

A power line communication apparatus is provided with an auto gain detector that detects a gain fluctuation of an AGC (Auto Gain Control) circuit that automatically adjusts a gain of a received signal; a retry ratio calculator that calculates a ratio of retry based on output from an ARQ (Automatic Repeat request) unit that detects an error in the received data and issues a repeat request; and a transmission rate calculator that calculates a transmission rate based on output from a channel estimation unit that calculates a CNR so as to estimate a transmission status. A display displays a transmission status, including the detected AGC noise fluctuation, retry ratio, transmission rate and the like.

19 Claims, 8 Drawing Sheets

U.S. PATENT DOCUMENTS

| | | | |
|---|---|---|---|
| 6,750,781 B1 | 6/2004 | Kim | |
| 6,907,044 B1 | 6/2005 | Yonge | |
| 6,985,714 B2 | 1/2006 | Akiyama | |
| 6,998,962 B2 * | 2/2006 | Cope et al. | 370/351 |
| 7,023,324 B2 | 4/2006 | Kodama | |
| 7,092,693 B2 * | 8/2006 | Boyden et al. | 455/402 |
| 7,236,765 B2 * | 6/2007 | Bonicatto et al. | 455/402 |
| 7,250,848 B2 | 7/2007 | White | |
| 7,268,670 B2 | 9/2007 | Robertson | |
| 7,269,403 B1 * | 9/2007 | Miao | 455/402 |
| 7,298,706 B2 | 11/2007 | Yoshida | |
| 7,301,440 B2 | 11/2007 | Mollenkopf | |
| 7,380,028 B2 | 5/2008 | Crinon | |
| 7,391,714 B2 | 6/2008 | Blasco Claret | |
| 7,414,518 B2 * | 8/2008 | Kline | 340/12.32 |
| 7,437,140 B2 * | 10/2008 | Iwamura | 455/402 |
| 7,480,336 B2 | 1/2009 | Park | |
| 7,522,514 B2 | 4/2009 | Tzannes | |
| 7,583,952 B2 * | 9/2009 | Lee et al. | 455/402 |
| 7,627,304 B2 | 12/2009 | Koga | |
| 2001/0046074 A1 | 11/2001 | Kakizaki | |
| 2002/0098867 A1 | 7/2002 | Meiksin | |
| 2003/0006881 A1 * | 1/2003 | Reyes | 340/310.01 |
| 2003/0016123 A1 | 1/2003 | Tager | |
| 2003/0133473 A1 * | 7/2003 | Manis et al. | 370/480 |
| 2004/0113756 A1 * | 6/2004 | Mollenkopf | 340/310.01 |
| 2005/0037722 A1 | 2/2005 | Koga | |
| 2006/0203897 A1 | 9/2006 | Kodama | |
| 2007/0025383 A1 | 2/2007 | Katar | |
| 2007/0025391 A1 | 2/2007 | Yonge | |
| 2009/0074044 A1 | 3/2009 | Yokomitsu | |
| 2010/0272192 A1 | 10/2010 | Varadarajan | |

FOREIGN PATENT DOCUMENTS

| | | |
|---|---|---|
| JP | 05-260111 | 10/1993 |
| JP | 11-015799 | 1/1999 |
| JP | 11-154917 | 6/1999 |
| JP | 11-266190 | 9/1999 |
| JP | 2000/165304 | 6/2000 |
| JP | 2002-51009 | 2/2002 |
| JP | 2002-164823 | 6/2002 |
| JP | 2004-186736 | 7/2004 |
| JP | 2005-20732 | 1/2005 |
| JP | 2005-026946 | 1/2005 |

OTHER PUBLICATIONS

Japanese Office Action dated Jul. 7, 2010 with partial English translation.

Japanese Office Action dated Jan. 11, 2011 with Partial English translation.

* cited by examiner

POWER LINE COMMUNICATION APPARATUS AND POWER LINE COMMUNICATION METHOD This is a continuation application of application Ser. No. 12/626,524 filed Nov. 25, 2009, which is a continuation application of application Ser. No. 11/398,707 filed Apr. 6, 2006, which is based on Japanese application number 2005-112318 filed Apr. 8, 2005, the entire contents of each of which are incorporated by reference herein.

BACKGROUND

1. Field of the Invention

The present invention relates to a power line communication apparatus and a power line communication method for data transmission via connection to a power line.

2. Description of Related Art

Recently proposed is a power line communication system that superimposes high-frequency signals on power lines that transfer power, including a commercial power supply, in order to transmit data. A communication apparatus employing a multi-carrier transmission system, which transmits and receives multi-carrier communication signals, is known as such power line communication system (e.g., Japanese Patent Laid-open Publication 2000-165304).

In such power line communication system, the availability of power line outlets, which are located in each room of a building, makes it convenient to connect terminal apparatuses. However, wiring of power lines, which are used as transmission lines, is very complicated. Further, noises and impedance fluctuations occur due to a variety of electric appliances connected. Thus, fluctuations in transmission characteristics are supposedly large among wired communications.

Thus, when transmitting data between the terminal apparatuses using all frequency bands available for the power lines, a desired transmission rate may not be achieved, thereby adversely affecting high-speed data transmission. With the above-described conventional power line communication apparatus, however, a user of the communication apparatus can not easily confirm a transmission status when the transmission characteristics of the power line are affected by noises or impedance fluctuation.

SUMMARY

The present invention is provided to overcome the above-identified problems. An object of the present invention is to provide a power line communication apparatus and a power line communication method that allow a visual check of a transmission status.

The power line communication apparatus transmits data via a power line. The power line communication apparatus includes: a transmission line connecting unit that receives a signal via the power line; a transmission status detector that detects a transmission status based on the signal received by the transmission line connecting unit, the transmission status varying with a noise level of the power line; and a display that displays the transmission status detected by the transmission status detector. The configuration allows a user to easily confirm the transmission status in power line communication.

Further, an integrated circuit transmits data via a power line. The integrated circuit includes: a transmission status detector that detects a transmission status based on a signal received via the power line, the transmission status varying with a noise level of the power line; and a display controller that displays on a display the transmission status detected by the transmission status detector. The configuration allows a user to easily confirm the transmission status in power line communication.

Furthermore, the power line communication method transmits data via a power line. The power line communication method includes: receiving a signal via the power line; detecting a transmission status based on the received signal, the transmission status varying with a noise level of the power line; and displaying the detected the transmission status. The configuration allows a user to easily confirm the transmission status in power line communication.

DETAILED DESCRIPTION

Figure 1:
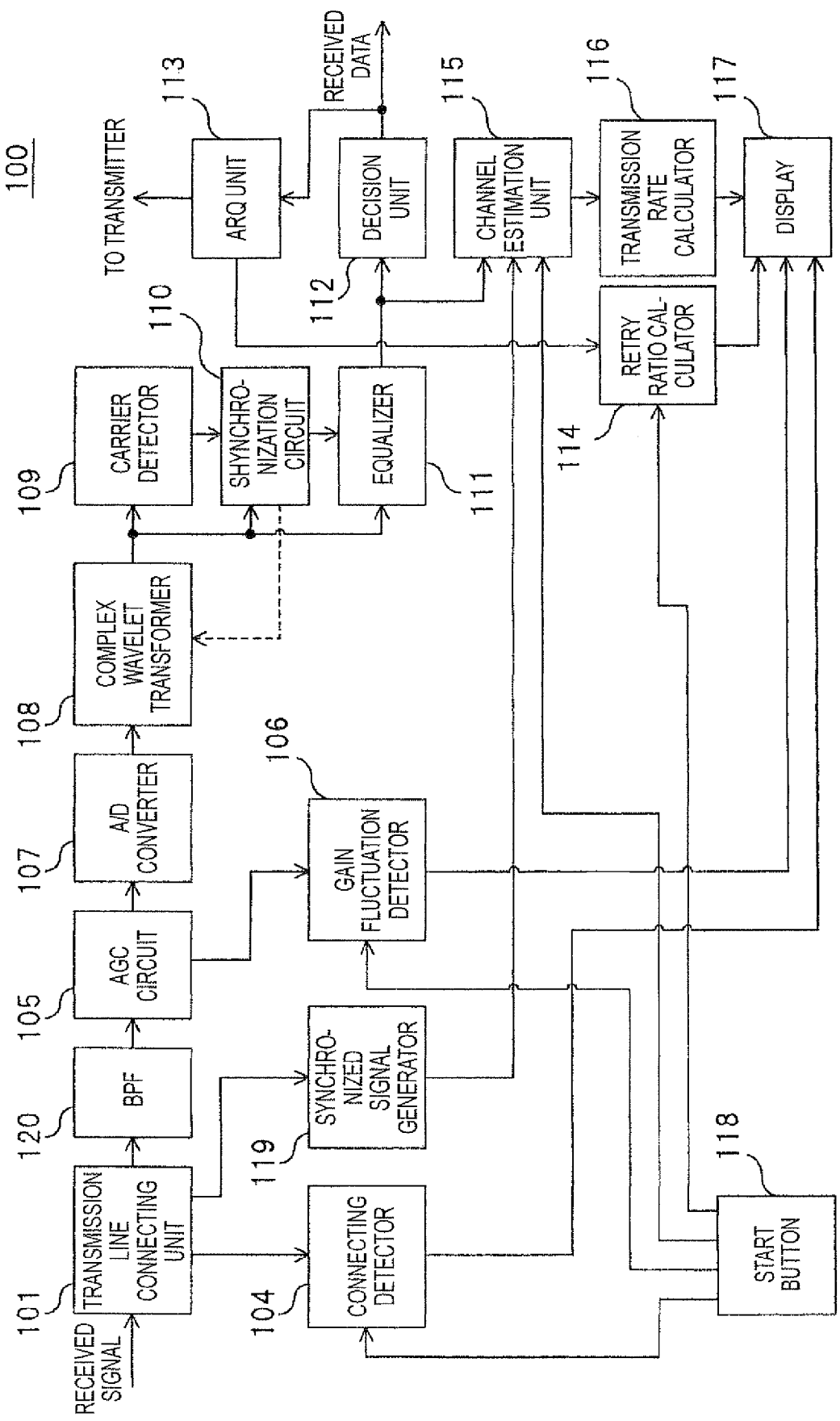
FIG. 1 illustrates a general configuration of a power line communication apparatus according to an embodiment.

The embodiment of the power line communication apparatus, the integrated circuit, and the power line communication method is explained in the following, with reference to the above-described drawings, in which like reference numerals represent similar parts throughout the several views of the drawings.

As an example of a data transmission system, a multi-carrier transmission system, which employs a digital modulation/demodulation process that uses a real coefficient wavelet filter bank for data communication, is used in the embodiment of the present invention.

Further, as an apparatus that enables wired communication via a plurality of transmission lines, a configuration of a power line communication apparatus that enables wired communication via a power line, a television antenna line (coaxial line) and a telephone line wired in a building is explained in the embodiment of the present invention.

As shown in FIG. 1, power line communication apparatus 100 includes: transmission line connecting unit 101 that connects to transmission lines; analog filter (BPF: Band Pass Filter) 120; connection detector 104 that detects a connection status of the transmission lines; AGC (Auto Gain Control) circuit 105 that automatically adjusts a gain of a received signal; gain fluctuation detector 106 that detects an AGC gain fluctuation; and A/D converter 107 that converts an analog signal into a digital signal.

Power line communication apparatus 100 further includes: complex wavelet transformer 108 or the like that performs multi-carrier demodulation for the received signal and generates an in-phase signal and an orthogonal signal; carrier detector 109 that detects the received signal; synchronization circuit 110 that synchronizes with the received signal; equalizer 111 that corrects a distorted signal having been affected by the transmission lines; and decision unit 112 that uses a signal output from equalizer 111 for determination.

Power line communication apparatus 100 further includes: Automatic Repeat reQuest unit (hereinafter referred to as an ARQ unit) 113 that detects an error in received data and that issues an ARQ to a transmitting side; and retry ratio calculator 114 that calculates a frequency of repeat requests (a ratio of retry) or a proportion of data for repeat requests.

Further, power line communication apparatus 100 includes channel estimation unit 115, transmission rate calculator 116 and display 117. Channel estimation unit 115 uses the signal output from equalizer 111 so as to determine a primary modulation scheme per sub-carrier for all sub-carriers. Transmission rate calculator 116 calculates a current transmission rate based on output from channel estimation unit 115. Display 117 displays: a currently connected transmission line or a transmission line being in communication detected by connection detector 104; the fluctuation in an AGC level detected by gain fluctuation detector 106; the ratio of retry calculated by retry ratio calculator 114; the current transmission rate calculated by transmission rate calculator 116; and the like.

Furthermore, power line communication apparatus 100 includes input device such as start button (start instruction input unit) 118 (hereinafter referred to as a "start button") and synchronized signal generator 119. Start button 118 provides an instruction to start calculation for obtaining information, such as the transmission rate, the ratio of retry and the like, at least one of which is displayed on display 117. Synchronized signal generator 119 generates a synchronized signal for channel estimation, based on a timing of an AC power waveform supplied from the power line connected to transmission line connecting unit 101.

Figure 2:
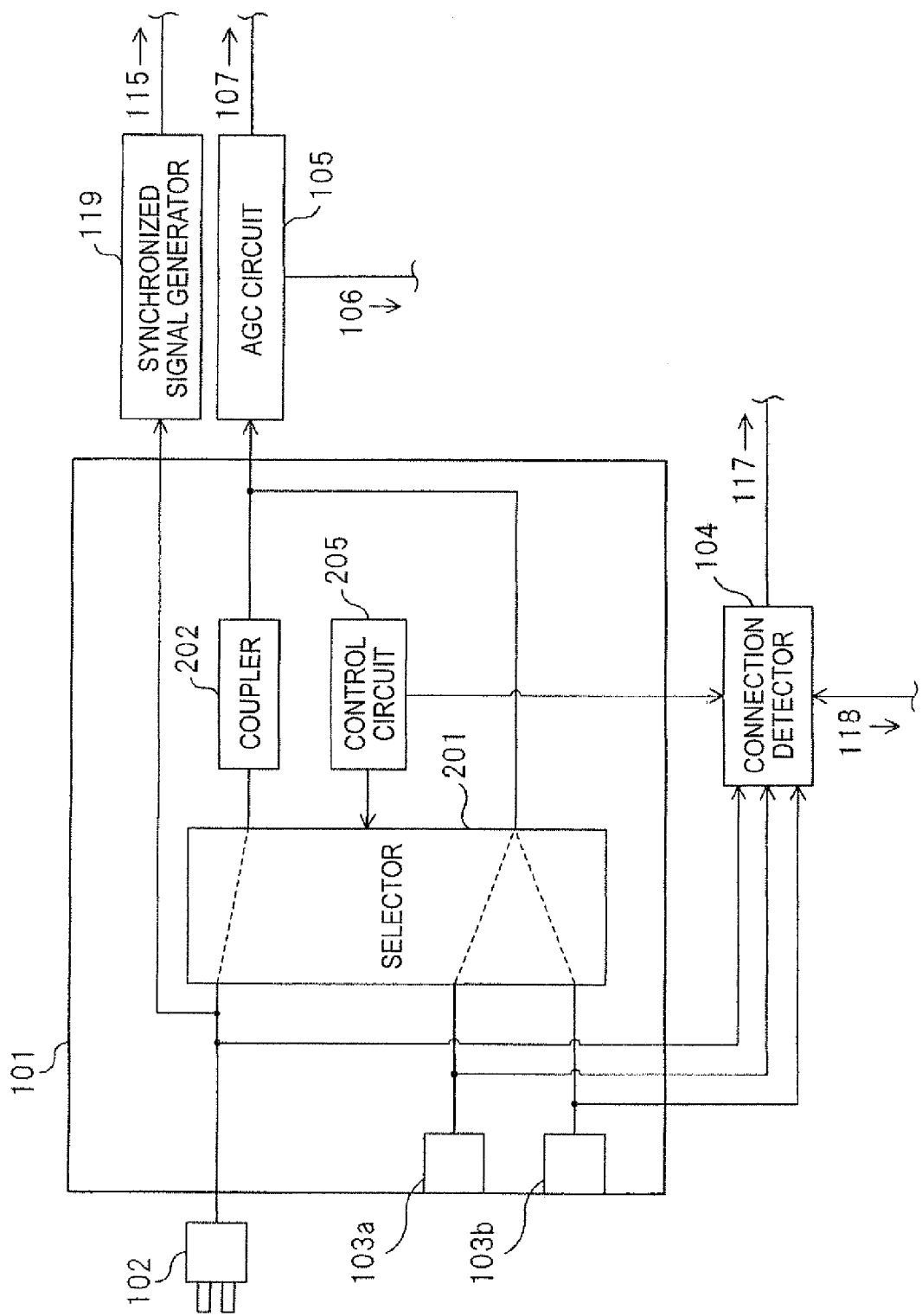
FIG. 2 illustrates a general configuration of a transmission line connecting unit according to the embodiment.

As shown in FIG. 2, transmission line connecting unit 101 includes: plug 102 that connects to a power line outlet in a room; telephone line (RJ-11) connector 103a that connects to a telephone line; coaxial connector (F terminal) 103b that connects to a television antenna line; selector 201 that switches both connection to plug 102 and connection to telephone line connector 103a and coaxial connector 103b so as to select a line to receive and transmit a communication signal from among plug 102, telephone line connector 103a and coaxial connector 103b; coupler 202 that disconnects the power line connected to plug 102 from AGC circuit 105 and that allows transmission of the communication signal between AGC circuit 105 and the power line; and control circuit 205 that controls the signal path switching by selector 201.

Selector 201 switches the connection based on control of control circuit 205. That is, selector 201 selectively connects a signal from plug 102 to AGC circuit 105 via coupler 202, or a signal from telephone line connector 103a or coaxial connector 103b to AGC circuit 105.

Transmission line connecting unit 101 enables wired communication by connecting to the power line and to the other transmission lines, that is, the telephone line or the television antenna line. When connecting telephone line connector 103a or coaxial connector 103b to AGC circuit 105, selector 201 disconnects coupler 202 from the power line connected to plug 102, so as to prevent the communication signal from flowing into the power line.

When connecting neither telephone line connector 103a nor coaxial connector 103b to AGC circuit 105, selector 201 directly connects plug 102 to coupler 202, thus allowing transmission of the communication signal via the power line.

A user may manually operate the selection and switching of the transmission lines by control circuit 205 and selector 201. It is also possible to have a configuration where the transmission lines are automatically selected based on a detected transmission status (e.g., an S/N ratio).

Operations of power line communication apparatus 100 having the configuration above are explained below. The signal received via transmission line connecting unit 101, to which one of plug 102, coaxial connector 103a and telephone line connector 103b is connected, is adjusted and amplified to a predetermined gain level by AGC circuit 105, and then converted into a digital signal by A/D converter 107. Complex wavelet transformer 108 performs wavelet transform to the digital signal, and carrier detector 109 detects the signal from the transmitting apparatus.

Using a preamble signal, synchronization unit 110 adjusts a timing of the wavelet transform by complex wavelet transformer 108 so as to synchronize with the received signal. Equalizer 111 removes an effect from the transmission lines. Channel estimation unit 115 calculates noise levels such as a CNR (Carrier to Noise Ratio), based on a variance of a constellation (±1 for 2PAM: Pulse Amplitude Modulation) as noise volume. Based on the CNR, channel estimation unit 115 then determines the primary modulation scheme (e.g., 16PAM or 8PAM) used for each sub-carrier on a symbol mapper of the transmitting apparatus. Decision unit 112 performs a reverse process of the symbol mapper, that is demapping, by using the signal output from equalizer 111.

When the user presses start button 118 on such communication apparatus, connection detector 104, a CPU (not shown in the figure) activates gain fluctuation detector 106, retry ratio calculator 114 and channel estimation unit 115.

Connection detector 104 detects the presence of a signal from the transmission lines connected to plug 102 through coaxial connector 103a or telephone line connector 103b. Connection detector 104 then determines whether or not a connection is made to each transmission line and notifies display 117. It is also possible to attach sensors to plug 102 and connectors 103a and 103b so as to determine connections to the transmission lines. Based on a control signal to a transmission line from selector 201 controlled by control circuit 205, connection detector 104 then determines and notifies display 117 which transmission line is selected.

Gain fluctuation detector 106 detects the fluctuation of the AGC level in AGC circuit 105, obtains a wideband noise and notifies display 117.

In response to a repeat request signal from ARQ unit 113, retry ratio calculator 114 calculates the frequency of transmission signals repeated from a transmitter, which is not shown in the figure, and notifies display 117.

Based on the CNR calculated in channel estimation unit 115, transmission rate calculator 116 calculates a current transmission rate. Display 117 displays the detection and calculation results.

Figure 3:
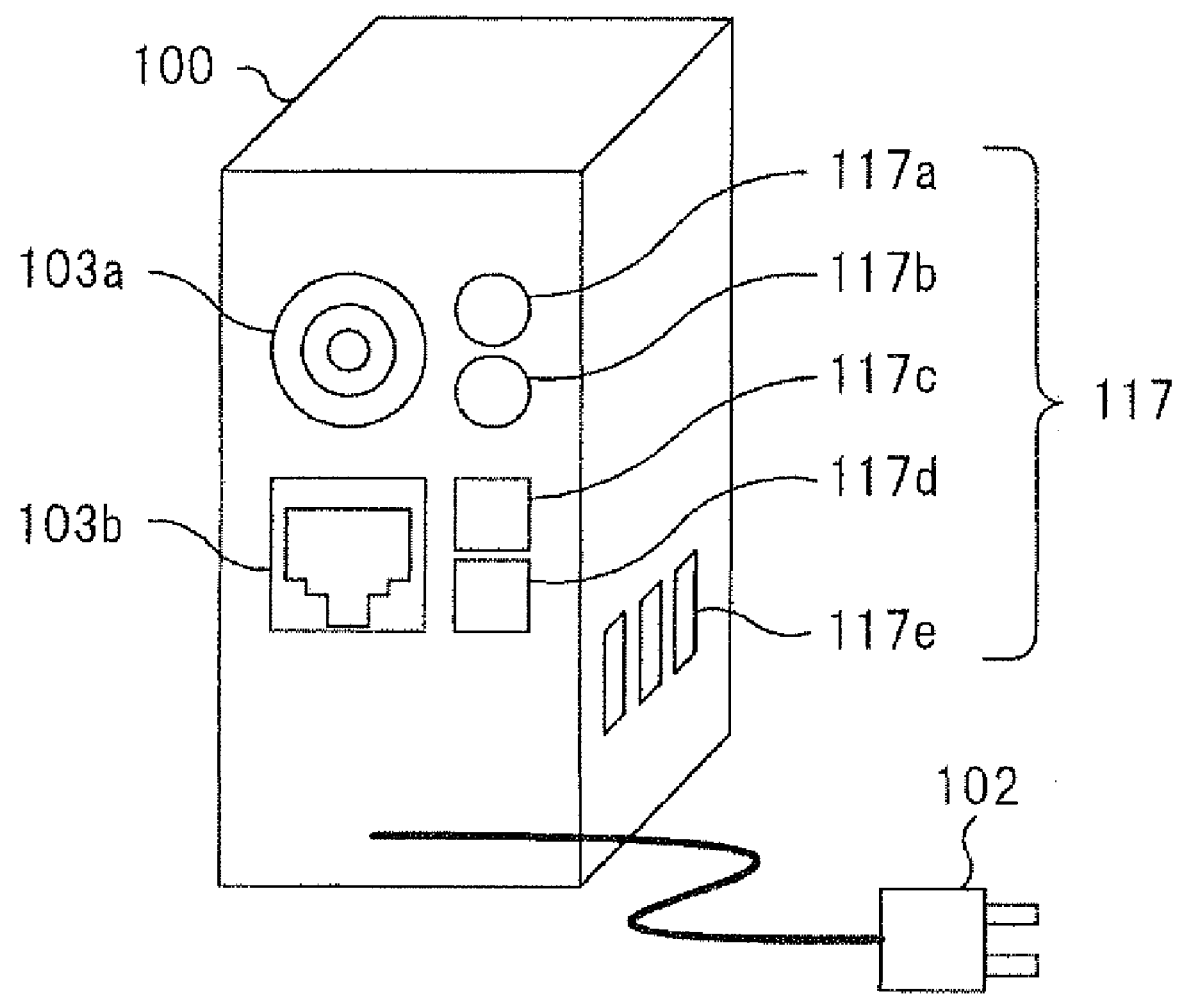
FIG. 3 illustrates an external structure of the power line communication apparatus according to the embodiment.

As shown in FIG. 3, power line communication apparatus 100 is structured so as to connect to a power line outlet via plug 102 provided for connection to a power line outlet. In addition to coaxial connector 103a and telephone line connector 103b, power line communication apparatus 100 is provided on its front side with display 117, which includes LEDs 117a, 117b, 117c and 117d. LED 117a lights when coaxial connector 103a is connected via a coaxial cable to an indoor coaxial outlet, which is not shown in the figure. LED 117b lights while a communication is being made via connector 103a. LED 117c lights when telephone line connector 103b is connected via a telephone line to an indoor telephone line outlet, which is not shown in the figure. LED 117d lights while a communication is being made via connector 103*b*. LEDs 117*a* and 117*c* light based on a signal output from connection detector 104, which indicates whether or not a connection is made to the transmission lines. LEDs 117*b* and 117*d* light based on a signal output from connection detector 104, which indicates a selected transmission line, and on a signal output from a receiver or a transmitter, which indicates that a communication is being made.

A plurality of LEDs 117*e* are provided on the side of power line communication apparatus 100. The number of the plurality of lit LEDs 117*e* differs depending on the transmission rate calculated by transmission rate calculator 116. For the plurality of above-described LEDs, only one LED may be provided so that the LED lights in different colors or flashes to indicate the status of plurality. Instead of flashing/turning off of the LED, other display methods, such as an LCD, may be used to indicate the status.

Figure 4:
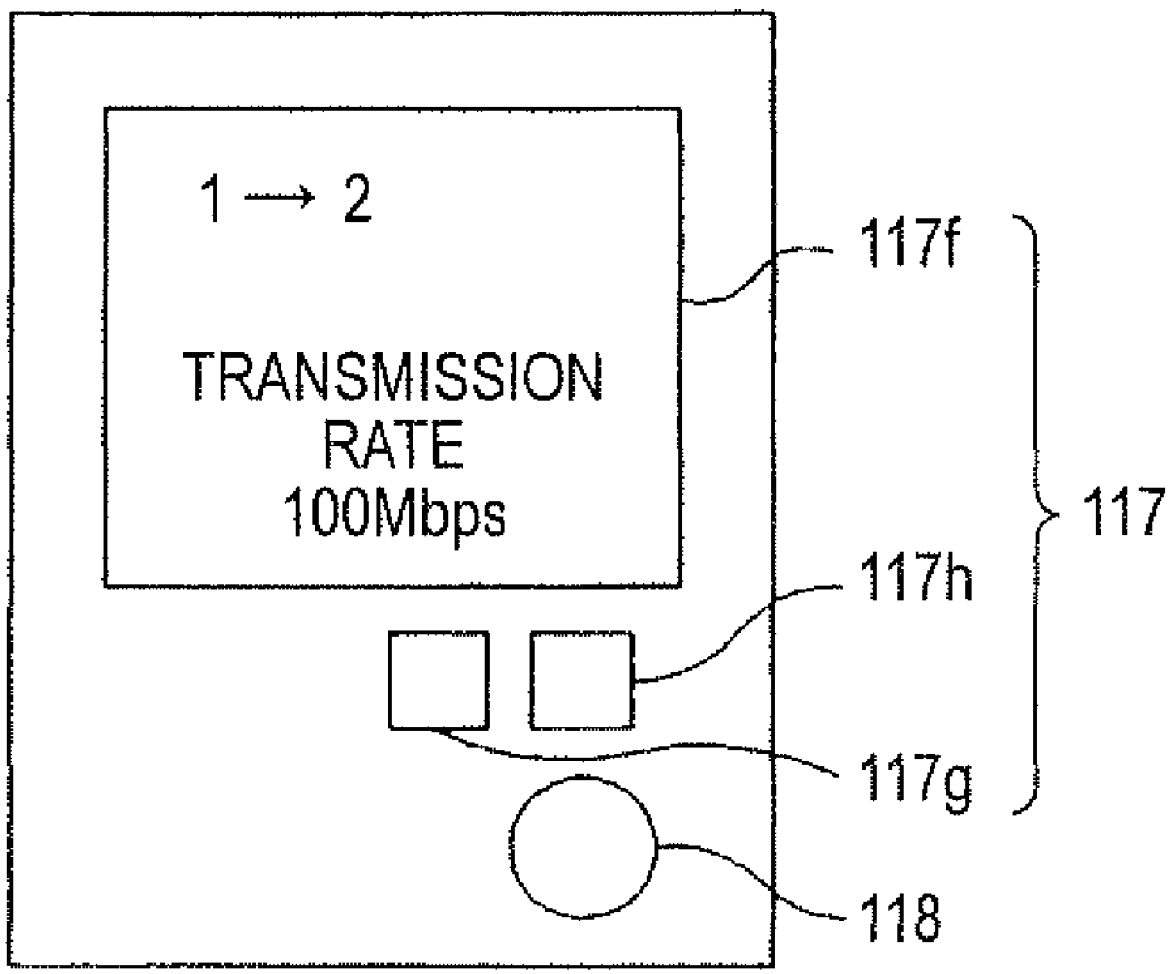
FIG. 4 illustrates a front panel of the power line communication apparatus according to the embodiment.

As shown in FIG. 4, display 117 in this example is provided with LCD 117*f*, LED 117*g* and LED 117*h*. LCD 117*f* displays communication apparatuses engaging in communication and a direction and a transmission rate. LED 117*g* lights when a noise fluctuation of the transmission lines exceeds a predetermined value, the noise fluctuation calculated from the AGC gain fluctuation detected by gain fluctuation detector 106. LED 117*h* lights when the retry ratio calculated by retry ratio calculator 114 exceeds a predetermined value.

FIG. 4 shows identification information of the communication apparatuses currently engaging in communication as "1→2," which indicates that a first power line communication apparatus (hereinafter referred to as a "first communication apparatus") #1 transmits data to a second power line communication apparatus (hereinafter referred to as a "second communication apparatus") #2. Further shown in FIG. 4 is "100 Mbps," which indicates that the transmission rate is 100 Mbps. The communication apparatuses are identified based on the data obtained from a communication destination during channel estimation. For names of the communication apparatuses, registered communication apparatus names may be used. An LCD and the like may replace LEDs 117*g* and 117*h* in order to indicate the noise fluctuation or the retry ratio.

The transmission rate is calculated in transmission rate calculator 116 of power line communication apparatus 100 shown in FIG. 1, based on a test signal between the communication apparatuses or CNRs calculated by channel estimation unit 115 for all sub-carriers being used in the current communication.

Figure 5:
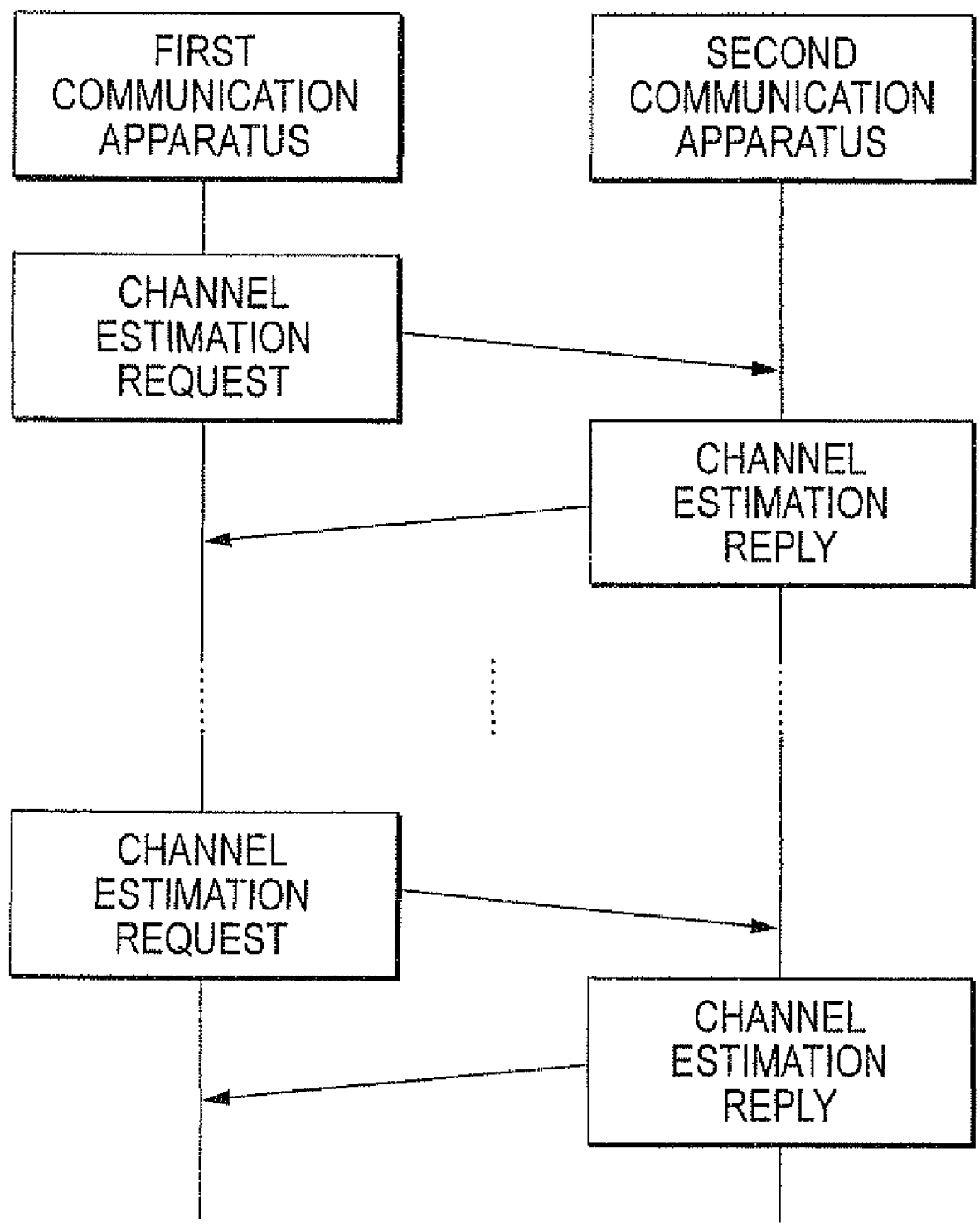
FIG. 5 is a diagram illustrating channel estimation between communication apparatuses.

As shown in FIG. 5, when the first communication apparatus communicates to the second communication apparatus, the first communication apparatus transmits a channel estimation request to the second communication apparatus. When receiving the channel estimation request from the first communication apparatus, the second communication apparatus transmits a reply to the request. The channel estimation is performed a plurality of times using, for example, unoccupied time slots or bands. The second communication apparatus creates a tone map every time when receiving the channel estimation request, and then, based on the channel estimation performed the plurality of times, selects an optimal tone map in respect of a system speed and a physical speed.

Figure 6:
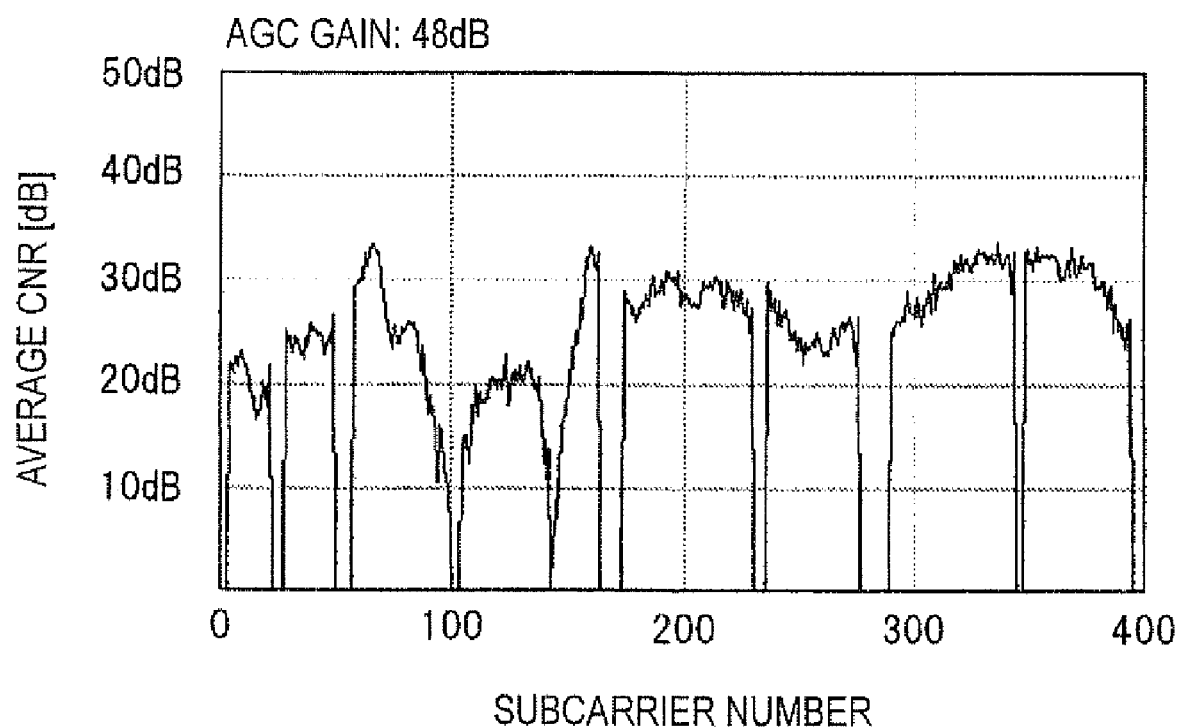
FIG. 6 illustrates a CNR of each sub-carrier obtained through the channel estimation.

In this example, calculating the CNRs for all sub-carriers used in communication is equivalent to performing the channel estimation. As shown in FIG. 6, the channel estimation provides characteristics indicating the relationship between each sub-carrier and its CNR. Based on the modulation scheme for each sub-carrier determined from the CNR characteristics obtained through the channel estimation, transmission rate calculator 116 calculates data received per one symbol duration (a time of one symbol is constant at, for example, 8.192 µs) and calculates a transmission rate based on the obtained data volume (bit count) per one symbol.

Taking into account a dynamic fluctuation in the transmission lines, it is preferable to obtain the transmission rate by calculating an average and the like based on results of the channel estimation performed the plurality of times, rather than based on a result of one time channel estimation, thereby providing the transmission rate in an accurate manner even in an adverse transmission line environment.

Figure 7:
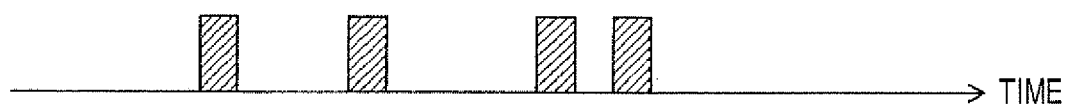
FIG. 7 illustrates a timing of the channel estimation performed a plurality of times.
Figure 8:
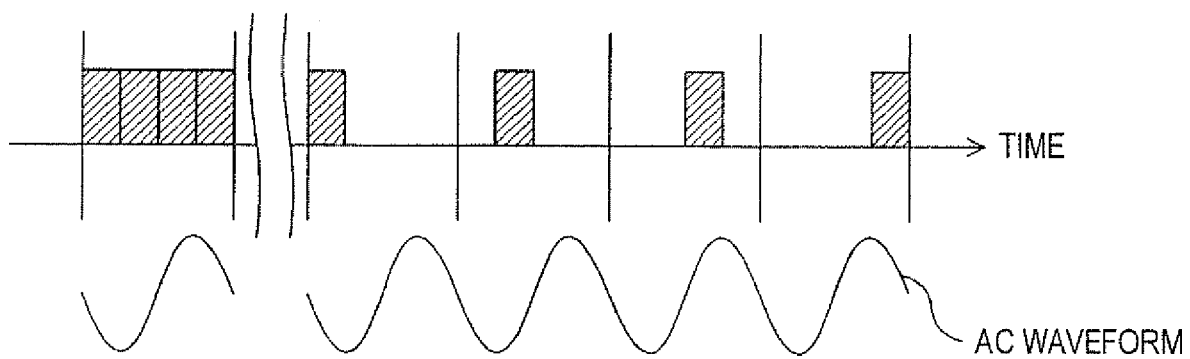
FIG. 8 illustrates a timing of the channel estimation performed a plurality of times in sync with an AC power waveform.

As for a timing to perform the channel estimation for the plurality of times, the channel estimation may be performed at random as shown in FIG. 7 or in sync with an AC power waveform as shown in FIG. 8.

Particularly, using the results of the channel estimation in sync with the AC power waveform provides averaged characteristics for the transmission characteristics, which can fluctuate in response to a cycle of the AC power waveform, thus allowing more accurate calculation of the transmission rate. The synchronized signal generated by synchronized signal generator 119 is not limited to be in sync with one cycle of the AC power waveform as shown, but may be in sync with a predetermined cycle, such as half a cycle or the like.

Further, a variation in the results obtained through each channel estimation indicates that a transmission line environment is poor due to the fluctuation in the transmission lines. When the variation, such as a difference or a dispersion of average CNRs of the sub-carriers for communication, is more than a predetermined value, transmission rate calculator 116 then provides an indication on display 117 using the LEDs and the like, so as to inform the user of the fluctuation in the transmission lines. Further, when a difference among transmission rates calculated from a plurality of tone maps is more than a predetermined threshold, the user can recognize the fluctuation in the transmission lines.

Figure 9:
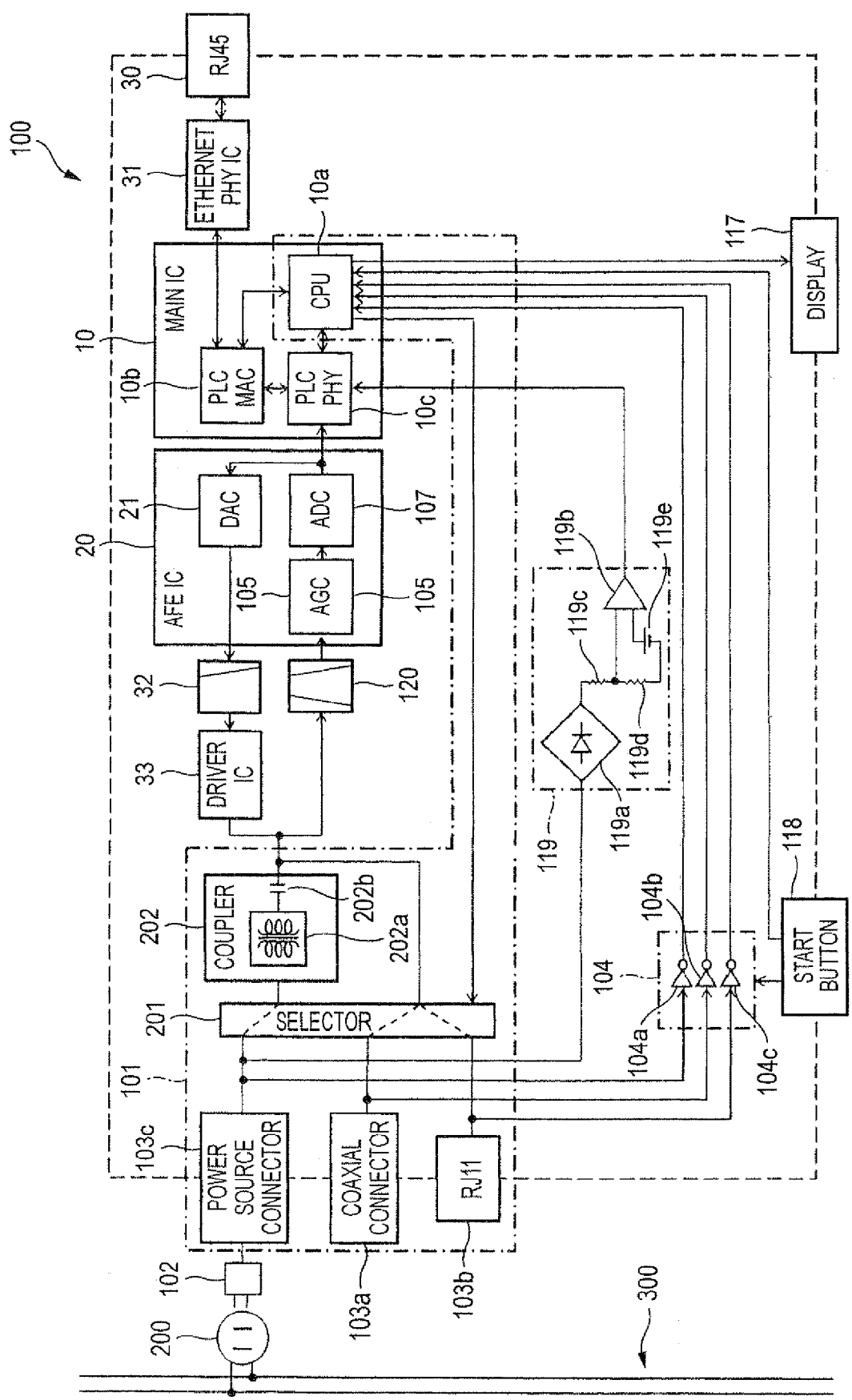
FIG. 9 is a block diagram illustrating a hardware example of the power line communication apparatus.

A circuit configuration shown in FIG. 9 is a concrete example of the general configurations of FIGS. 1 and 2. Descriptions on components already provided in FIGS. 1 and 2 are omitted.

As shown in FIG. 9, power line communication apparatus 100 is provided with main IC (Integrated Circuit) 10, AFE (Analog Front End) IC 20, Ethernet PHY IC 31, band pass filter 120, low pass filter 32, driver IC 15, coupler 202, selector 201, synchronized signal generator 119, connection detector 104, start button 118 and display 117. Further provided as external connection terminals are coaxial connector 103*a*, telephone line connector (RJ11) 103*b*, power source connector 103*c* and LAN connector (RJ45) 30. Power source connector 103*c* is connected to power line 300 via plug 102 and power line outlet 200.

Main IC 11 includes CPU (Central Processing Unit) 10*a*, PLC MAC (Power Line Communication Media Access Control layer) block 10*b* and PLC PHY (Power Line Communication Physical layer) block 10*c*. CPU 10*a* is installed with a 32-bit RISC (Reduced Instruction Set Computer) processor. PLC MAC block 10*b* controls a MAC layer of a transmission/reception signal, while PLC PHY block 10*c* controls a PHY layer of the transmission/reception signal. AFE IC 20 includes D/A converter (DAC) 21, A/D converter (ADC) 107 and AGC circuit 105. Coupler 202 includes coil transformer 202*a* and coupling capacitor 202*b*.

Synchronized signal generator 119 includes bridge connection diode 119*a*, two resistances 119*c* and 119*d*, DC power 119*e* and comparator 119*b*. Bridge connection diode 119*a* is connected to resistance 119*c*, which is connected to resistance 119*d* in series. These two resistances 119*c* and 119d are connected in parallel to a first input terminal on comparator 119b. To a second input terminal on the comparator, a plus terminal of DC power 119e is connected. Connection detector 104 includes three inverters 104a, 104b and 104c, which are connected to respective input terminals of power source connector 103c, coaxial connector 103c and telephone line connector 103b.

In FIG. 9, main IC 10 and AFE IC 20 are one type of an integrated circuit. CPU 10a of main IC 10 detects a transmission status, such as, for example, a transmission rate, based on a signal received through the power line. The transmission status varies with noise level of the power line, and indicates characteristics value such as a noise variation, the noise fluctuation, CNR, CINR (Carrier to Interference and Noise Ratio) and S/N ratio. The transmission status further indicates characteristics value such as the transmission rate and the ratio of retry. A method for detecting the transmission rate is identical to the method already explained. When detecting the transmission status, CPU 10a displays the transmission status on display 117.

The power line communication apparatus and the power line communication method according to the embodiment calculate the transmission rate based on CNRs calculated for all sub-carriers for communication and display the transmission rate on the display, thereby allowing the user to know a current transmission rate.

An expected transmission rate may be calculated using a selected tone map, regardless of the number of the channel estimation. When the channel estimation is performed the plurality of times and a plurality of tone maps are used, however, it is preferable to obtain and display an average of transmission rates from the plurality of tone maps.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application. No. 2005-112318 filed on Apr. 8, 2005, entire content of which is expressly incorporated by reference herein.

What is claimed is:

1. A power line communication apparatus for receiving a signal currently being carried on a plurality of subcarriers via a power line, the power line communication apparatus comprising:
    a transmission line connecting unit that receives via the power line the signal having a plurality of subcarriers;
    a noise level calculator that calculates a noise level corresponding to each of the plurality of subcarriers;
    a determination unit that determines, according to the noise level, a modulation scheme employed for each of the plurality of subcarriers to assign a data volume per symbol to each of the plurality of subcarriers;
    a transmission rate calculator that calculates a transmission rate by calculating, according to the data volume rate assigned to each of the plurality of subcarriers, a total data volume per symbol resulting from all of said plurality of subcarriers, said symbol having a constant duration; and
    a display that displays a status of the transmission rate.

2. The power line communication apparatus according to claim 1, wherein the transmission rate calculator calculates the transmission rate based on the noise level calculated a plurality of times by the noise level calculator.

3. The power line communication apparatus according to claim 2, wherein:
    the transmission rate calculator calculates a variation among the plurality of noise levels; and
    the display further displays the noise variation that indicates the variation among the calculated noise levels.

4. The power line communication apparatus according to claim 1, further comprising a synchronized signal generator that generates a synchronized signal based on an AC power waveform supplied by the power line, wherein the noise level calculator calculates the noise level based on the synchronized signal.

5. The power line communication apparatus according to claim 1, further comprising:
    an auto gain controller that controls a gain of the signal received by the transmission line connecting unit; and
    a gain fluctuation detector that detects a noise fluctuation of the power line based on the gain fluctuation controlled by the auto gain controller; and wherein:
    the display further displays the noise fluctuation detected by the gain fluctuation detector.

6. The power line communication apparatus according to claim 1, further comprising:
    a repeat request unit that detects an error in received data demodulated from the signal received by the transmission line connecting unit and issues a repeat request for the data having the error; and
    a retry ratio calculator that calculates a ratio of retry that indicates a frequency of repeat requests issued by the repeat request unit, wherein:
    the display further displays the ration of retry calculated by the retry ratio calculator.

7. The power line communication apparatus according to claim 1, further comprising:
    a start instruction input unit that receives input of an instruction for starting calculation of the transmission rate by the transmission rate calculator.

8. The power line communication apparatus according to claim 1, further comprising:
    a transmission status detector that detects at least one of identification information and a communication direction of communication apparatuses engaging in communication wherein:
    the display further displays at least one of the identification information and the communication direction of the communication apparatuses.

9. The power line communication apparatus according to claim 1, further comprising:
    a connection detector that detects at least one of transmission lines connected to the transmission line connecting unit and used for communication, the transmission lines including the power line, wherein:
    the power line communication apparatus receives the signal via at east one of transmission lines, and the display further displays at least one of the transmission lines detected by the connection detector.

10. The power line communication apparatus according to claim 1, wherein: the noise level calculator calculates the noise level at least once during one cycle of an AC power waveform.

11. The power line communication apparatus according to claim 10, wherein: the synchronized signal is in sync with one cycle of the AC power waveform.

12. The power line communication apparatus according to claim 10, wherein: the synchronized signal is in sync with less than one cycle of the AC power waveform.

13. The power line communication apparatus according to claim 12, wherein: the synchronized signal is in sync with half a cycle of the AC power waveform.

14. The power line communication apparatus according to claim 1, wherein the display displays the status of the transmission rate in numeric fashion.

15. The power line communication apparatus according to claim 1, wherein the display displays the status of the transmission rate in accordance with the color of light emitted by an LED.

16. The power line communication apparatus according to claim 1, wherein display displays the status of the transmission rate in accordance with flashes of an LED.

17. The power line communication apparatus according to claim 1, wherein display displays the status of the transmission rate in accordance with a number of LEDs being lit.

18. An integrated circuit for receiving a signal via a power line, the signal being carried on a plurality of subcarriers, the integrated circuit comprising:
  a noise level calculator that calculates a noise level corresponding to each of the plurality of subcarriers;
  a determination unit that determines, according to the noise level, a modulation scheme employed for each of the plurality of subcarriers to assign a data volume per symbol to each of the plurality of subcarriers;
  a transmission rate calculator that calculates a transmission rate by calculating, according to the data volume assigned to each of the plurality of subcarriers, a total data volume per symbol resulting from all of said plurality of subcarriers, said symbol having a constant duration; and
  a display controller that displays on a display a status of the transmission rate.

19. A power line communication method for communications via a power line, the power line communication method comprising:
  receiving via the power line a signal being carried on a plurality of subcarriers;
  calculating a noise level corresponding to each of the plurality of subcarriers;
  determining, according to the noise level, a modulation scheme employed for each of the plurality of subcarriers to assign a data volume per symbol to each of the plurality of subcarriers;
  calculating a transmission rate by calculating, according to the data volume assigned to each of the plurality of subcarriers, a total data volume per symbol resulting from all of said plurality of subcarriers, said symbol having a constant duration; and
  displaying on a display a status of the detected transmission rate.

* * * * *